US012160071B2

(12) United States Patent
Okubo

(10) Patent No.: US 12,160,071 B2
(45) Date of Patent: Dec. 3, 2024

(54) ELECTRICAL CONNECTOR AND ELECTRICAL CONNECTOR SET INCLUDING ELECTRICAL CONNECTOR

(71) Applicant: Murata Manufacturing Co., Ltd., Kyoto-fu (JP)

(72) Inventor: Daisuke Okubo, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 265 days.

(21) Appl. No.: 17/544,621

(22) Filed: Dec. 7, 2021

(65) Prior Publication Data

US 2022/0094110 A1 Mar. 24, 2022

Related U.S. Application Data

(63) Continuation of application No. PCT/JP2020/023738, filed on Jun. 17, 2020.

(30) Foreign Application Priority Data

Jun. 24, 2019 (JP) ................................. 2019-116400

(51) Int. Cl.

*H01R 12/71* (2011.01)
*H01R 13/652* (2006.01)
*H01R 24/60* (2011.01)

(52) U.S. Cl.

CPC ......... *H01R 13/652* (2013.01); *H01R 12/716* (2013.01); *H01R 24/60* (2013.01)

(58) Field of Classification Search

CPC .... H01R 13/652; H01R 12/716; H01R 24/60; H01R 12/712; H01R 13/6585; H01R 12/73

See application file for complete search history.

(56) References Cited

U.S. PATENT DOCUMENTS 6,250,935 B1 * 6/2001 Mochizuki ........... H01R 13/658 439/74
10,361,519 B2 * 7/2019 Chuang .................. H01R 13/41

(Continued)

FOREIGN PATENT DOCUMENTS

JP 2017-033654 A 2/2017
JP 2017-033655 A 2/2017

(Continued)

OTHER PUBLICATIONS

International Search Report issued in PCT/JP2020/023738; mailed Jul. 21, 2020.

(Continued)

*Primary Examiner* — Abdullah A Riyami
*Assistant Examiner* — Nelson R. Burgos-Guntin
(74) *Attorney, Agent, or Firm* — Studebaker & Brackett PC

(57) ABSTRACT

An electrical connector that includes a plurality of inner terminals that are arrayed in a first direction and extend in a second direction, an insulating member that has a terminal holding part that holds the inner terminals, and an outer terminal that surrounds the inner terminals when viewed in a third direction. The terminal holding part includes an insulating extending part that extends in the first direction. The outer terminal includes an outer extending part that extends in the first direction while being spaced apart from the insulating extending part along at least part thereof. An opening that extends in the first direction is formed between the insulating extending part and the outer extending part. The states of inner mounting parts of the inner terminals can be checked through the opening.

23 Claims, 11 Drawing Sheets

(56) References Cited

U.S. PATENT DOCUMENTS

| | | | | |
|---|---|---|---|---|
| 10,446,985 | B2 * | 10/2019 | Ooi | H01R 13/6471 |
| 11,011,874 | B2 * | 5/2021 | Kitazawa | H01R 12/716 |
| 11,075,475 | B2 * | 7/2021 | Chen | H01R 13/6585 |
| 2013/0005192 | A1 * | 1/2013 | Lim | H01R 12/716 439/660 |
| 2016/0240944 | A1 * | 8/2016 | Kodaira | H01R 12/707 |
| 2017/0070014 | A1 * | 3/2017 | Kodaira | H01R 24/60 |
| 2017/0271813 | A1 * | 9/2017 | Ge | H01R 13/504 |
| 2018/0183189 | A1 * | 6/2018 | Chuang | H01R 13/6585 |
| 2018/0198241 | A1 * | 7/2018 | Ooi | H01R 13/6597 |
| 2020/0212634 | A1 * | 7/2020 | Teruki | H01R 13/6471 |
| 2020/0212635 | A1 * | 7/2020 | Chen | H01R 12/73 |
| 2020/0335893 | A1 * | 10/2020 | Chen | H01R 13/6585 |

FOREIGN PATENT DOCUMENTS

| | | | |
|---|---|---|---|
| JP | 2017-033909 | A | 2/2017 |
| JP | 2017-208165 | A | 11/2017 |
| JP | 2018-116925 | A | 7/2018 |
| JP | 6493611 | B1 | 4/2019 |
| WO | 2018/025873 | A1 | 2/2018 |

OTHER PUBLICATIONS

Written Opinion of the International Searching Authority issued in PCT/JP2020/023738; mailed Jul. 21, 2020.

* cited by examiner

ELECTRICAL CONNECTOR AND ELECTRICAL CONNECTOR SET INCLUDING ELECTRICAL CONNECTOR

CROSS-REFERENCE TO RELATED APPLICATIONS

This application claims benefit of priority to International Patent Application No. PCT/JP2020/023738, filed Jun. 17, 2020, and to Japanese Patent Application No. 2019-116400, filed Jun. 24, 2019, the entire contents of each are incorporated herein by reference.

BACKGROUND

Technical Field

The present disclosure relates to an electrical connector and an electrical connector set including the electrical connector.

Background Art

For example, Japanese Unexamined Patent Application Publication No. 2017-033654 discloses an electrical connector that includes signal contact members (inner terminals), an insulating housing (insulating member) to which the signal contact members are attached, and an electrically conductive shell (outer terminal) that is attached to the insulating housing. A flat cover of the electrically conductive shell is provided with cover connection parts. The cover connection parts are protruding pieces that protrude toward the center of the connector so as to be connected to the insulating housing. In a spacing area between the cover connection parts, a flat inspection window is formed that allows substrate connection legs (inner mounting parts) of the signal contact members to be visually inspected.

SUMMARY

The cover connection parts are formed as protruding pieces that protrude from the flat cover so as to be supported by receiving parts of the insulating housing and so as to be disposed between substrate connection legs that are adjacent to each other in a longitudinal direction of the connector. The smaller the pitch of the signal contact members, the smaller the width, in the longitudinal direction of the connector, of the cover connection parts, and therefore the minute cover connection parts need to be precisely formed. It is necessary to carry out complex processing on the electrically conductive shell in order to precisely form the minute cover connection parts, and therefore processing costs are increased.

Accordingly, the present disclosure provides an electrical connector and an electrical connector set provided with the electrical connector that have openings through which the states of inner mounting parts of inner terminals can be checked without the need for complex processing.

An aspect of the present disclosure provides an electrical connector that includes a plurality of inner terminals that are arrayed in a first direction, an insulating member that has a terminal holding part that holds the inner terminals, and an outer terminal that surrounds the inner terminals. The terminal holding part includes an insulating extending part that extends in the first direction. The outer terminal includes an outer extending part that extends in the first direction while being spaced apart from the insulating extending part along at least part thereof. An opening that extends in the first direction is formed between the insulating extending part and the outer extending part. States of inner mounting parts of the inner terminals can be checked through the opening.

According to the present disclosure, since the opening is formed by the insulating extending part, which extends in the first direction, and the outer extending part, which extends in the first direction while being spaced apart from the insulating extending part, it is possible to form the opening, through which the states of the inner mounting parts of the inner terminals can be checked, without the need for complex processing.

DETAILED DESCRIPTION

Figure 1:
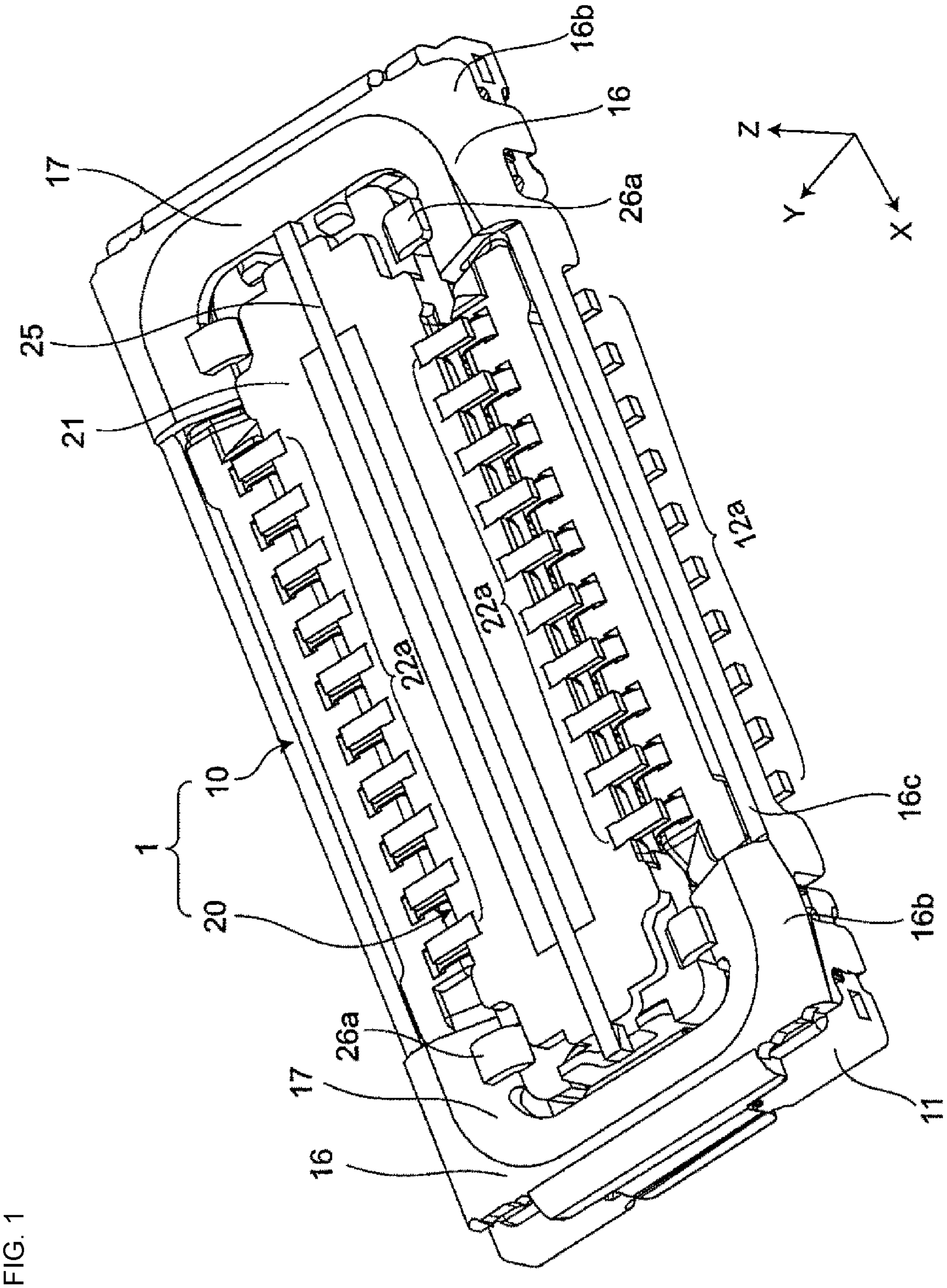
FIG. 1 is a perspective view illustrating an electrical connector set according to a First Embodiment.

Hereafter, an electrical connector 10 and an electrical connector set 1 that includes the electrical connector 10 according to embodiments of the present disclosure will be described while referring to the drawings. For convenience, an X axis, a Y axis, and a Z axis, which are perpendicular to each other, are illustrated in each drawing. In this specification, a first direction, a second direction, and a third direction are respectively defined by the X axis, the Y axis, and the Z axis. Therefore, the first direction, the second direction, and the third direction are perpendicular to each other.

(Electrical Connector Set)

FIG. 1 is a perspective view illustrating an electrical connector set 1 according to a First Embodiment.

As illustrated in FIG. 1, the electrical connector set 1 includes a first connector (electrical connector) 10 and a second connector (counterpart electrical connector) 20 that mates with the first connector 10 in an insertable-removable manner in the third direction (insertion-removal direction, Z axis direction). The electrical connector set 1 is configured so that the first connector 10 and the second connector 20 are mated with each other by moving the second connector 20 in the third direction toward the first connector 10 with the second connector 20 facing the first connector 10.

(First Connector)

Figure 4:
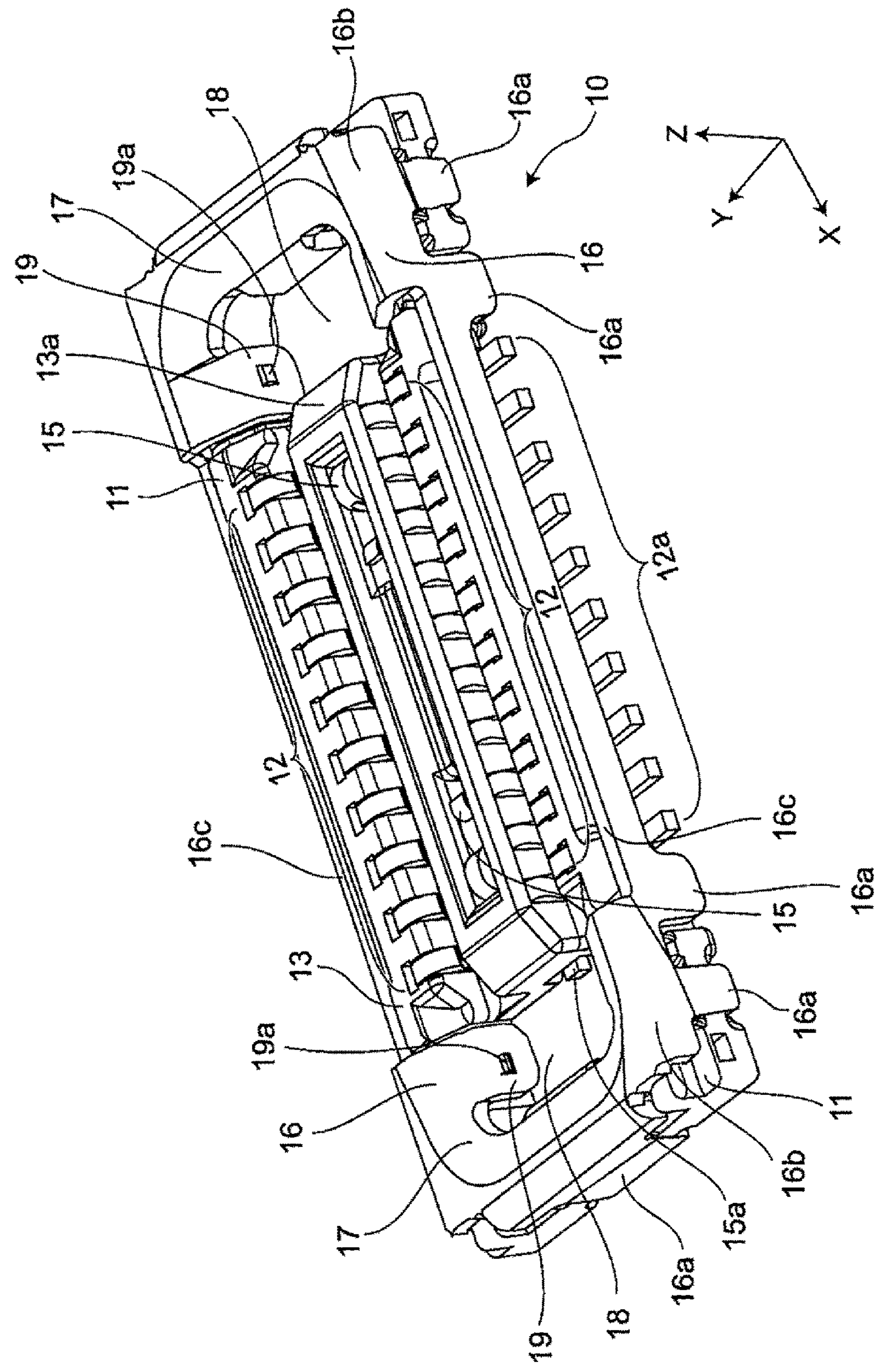
FIG. 4 is a perspective view of a first connector of the electrical connector set illustrated in FIG. 1.
Figure 5:
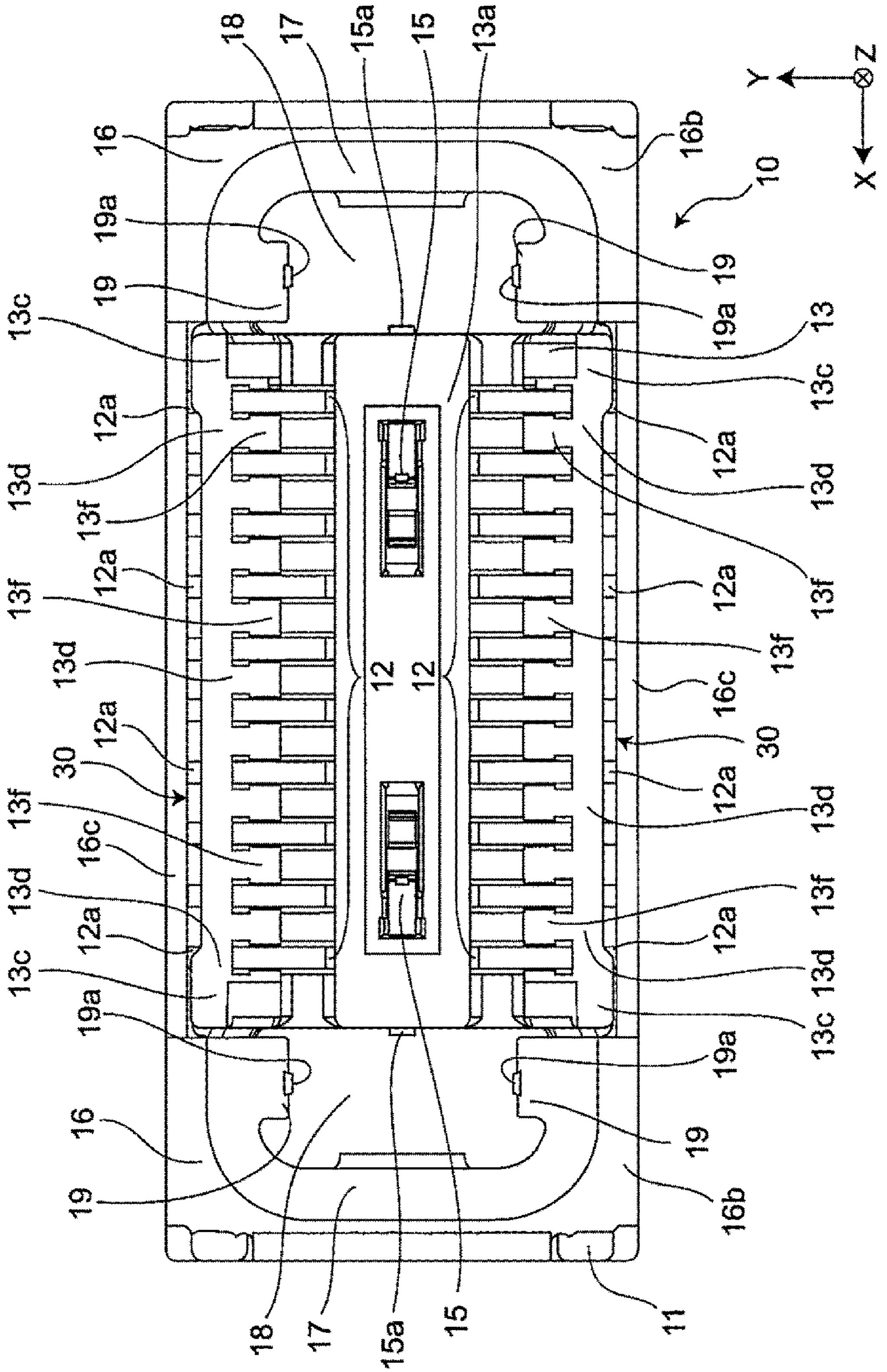
FIG. 5 is a plan view of the first connector illustrated in FIG. 4.

First, the basic configuration of the first connector 10 will be described while referring to FIGS. 4 and 5. FIG. 4 is a perspective view of the first connector 10 of the electrical connector set 1 illustrated in FIG. 1. FIG. 5 is a plan view of the first connector 10 illustrated in FIG. 4.

The first connector 10 includes a first insulating member (insulating member) 11, first inner terminals (inner terminals) 12, a first shield terminal (shield terminal) 15, and a first outer terminal (outer terminal) 16. For example, an electrically insulating resin such as a liquid crystal polymer is used for the first insulating member 11. The first insulating member 11 includes a first terminal holding part (terminal holding part) 13 and two first lateral support parts 14 (illustrated in FIGS. 6 and 7). The first terminal holding part 13 is provided substantially in a center part of the first connector 10 in the first direction (longitudinal direction, X axis direction) and the two first lateral support parts 14 are respectively provided at the two ends of the first connector 10 in the first direction so as to be separated from each other.

The first terminal holding part 13 of the first insulating member 11 has concave first inner terminal mounting parts. The first inner terminals 12 are held by mounting the first inner terminals 12 in the first inner terminal mounting parts. The first inner terminals 12 extend in the second direction. The meaning of the phrase "the first inner terminals 12 extend in the second direction" is intended to include directions that slightly deviate from the second direction in addition to a direction that matches the second direction. The first inner terminals 12 are provided in the first terminal holding part 13, which is located in substantially the center of the first connector 10 in the first direction, and consist of a plurality of connection terminals (for example, having a concave shape) arrayed in the first direction. Therefore, the first inner terminals 12 are usually also referred to as female multi-pole connection terminals. Among the first inner terminals 12 illustrated in FIG. 4, ten connection terminals and another ten connection terminals disposed in single rows extending in the first direction are disposed so as to be spaced apart from each other in the second direction (direction perpendicular to longitudinal direction, Y axis direction) as a row on one side and a row on the other side. With this configuration, a large number of first inner terminals 12 can be disposed in the area of the first terminal holding part 13, which has a limited size. The arrangement of the multi-pole first inner terminals 12 is not limited to two rows, with one row on one side and one row on the other side, and can instead consist of one row or three or more rows. In addition, the number of first inner terminals 12 in each row is not limited to 10, and can be 9 or less or 11 or more.

The electrically conductive first shield terminal (shield terminal) 15 is provided between the rows of the first inner terminals 12 located on the one side and the other side in order to suppress electromagnetic wave interference between the rows of the first inner terminals 12 (in other words, to isolate the rows of first inner terminals 12 from each other). The first shield terminal 15 is, for example, held by being fitted into a center groove of a first shield holding part 13*a*. The first shield terminal 15 extends along the first direction. A plurality of concave connection terminals are arrayed as the first inner terminals 12, but a plurality of convex connection terminals may instead be arrayed as the first inner terminals 12. In this case, instead of a plurality of convex connection terminals, a plurality of concave connection terminals would be arrayed as second inner terminals 22 that engage with the first inner terminals 12.

The first inner terminals 12 are, for example, conductors that are connected to a signal potential or a ground potential and are formed by bending electrically conductive rod-shaped members. For example, phosphor bronze can be used for the first inner terminals 12. Phosphor bronze is a material that is electrically conductive and elastically deformable. The surfaces of the first inner terminals 12 may be plated with gold, for example. The first inner terminals 12 have first inner mounting parts 12*a* that are for mounting on land electrodes of a circuit board, which is not illustrated. In other words, the first inner mounting parts 12*a* are parts of the first inner terminals 12 that are to be connected to an electrically conductive bonding material such as solder and mounted on a circuit board. The first inner mounting parts 12*a* are formed along lateral edges located in the second direction.

The first lateral support parts 14 include first outer terminal mounting parts. Corresponding first outer lateral parts 16*b* of the first outer terminal 16 are mounted on and supported by the first outer terminal mounting parts. The first outer lateral parts 16*b* include a plurality of first outer mounting parts 16*a* that are for mounting on a ground electrode of a circuit board, which is not illustrated. The first outer mounting parts 16*a* are formed at a lower edge in the third direction.

The first outer terminal 16 is a conductor that is connected to a ground potential. The space surrounded by the first outer terminal 16 can be made into a space shielded from electromagnetic waves by connecting the first outer terminal 16 to the ground potential in order to shield the space against electromagnetic waves from the outside and unwanted radiation from the first inner terminals 12. In other words, the first outer terminal 16 is a member for electromagnetically shielding the first inner terminals 12 by surrounding the first inner terminals 12. For example, phosphor bronze can be used for the first outer terminal 16. Phosphor bronze is a material that is electrically conductive and elastically deformable. The first outer terminal 16 is, for example, formed by performing bending processing.

(Second Connector)

Figure 2:
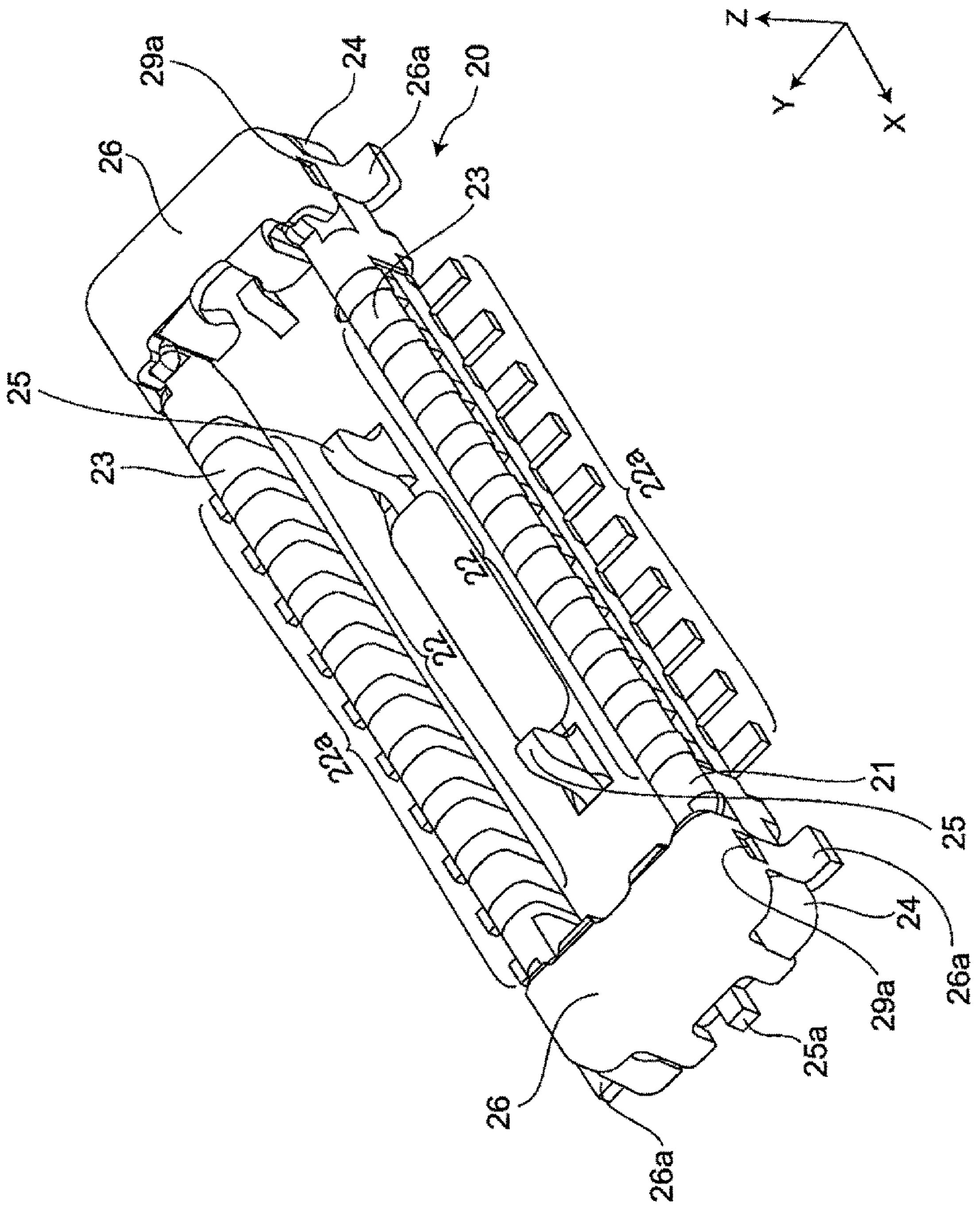
FIG. 2 is a perspective view of a second connector of the electrical connector set illustrated in FIG. 1.
Figure 3:
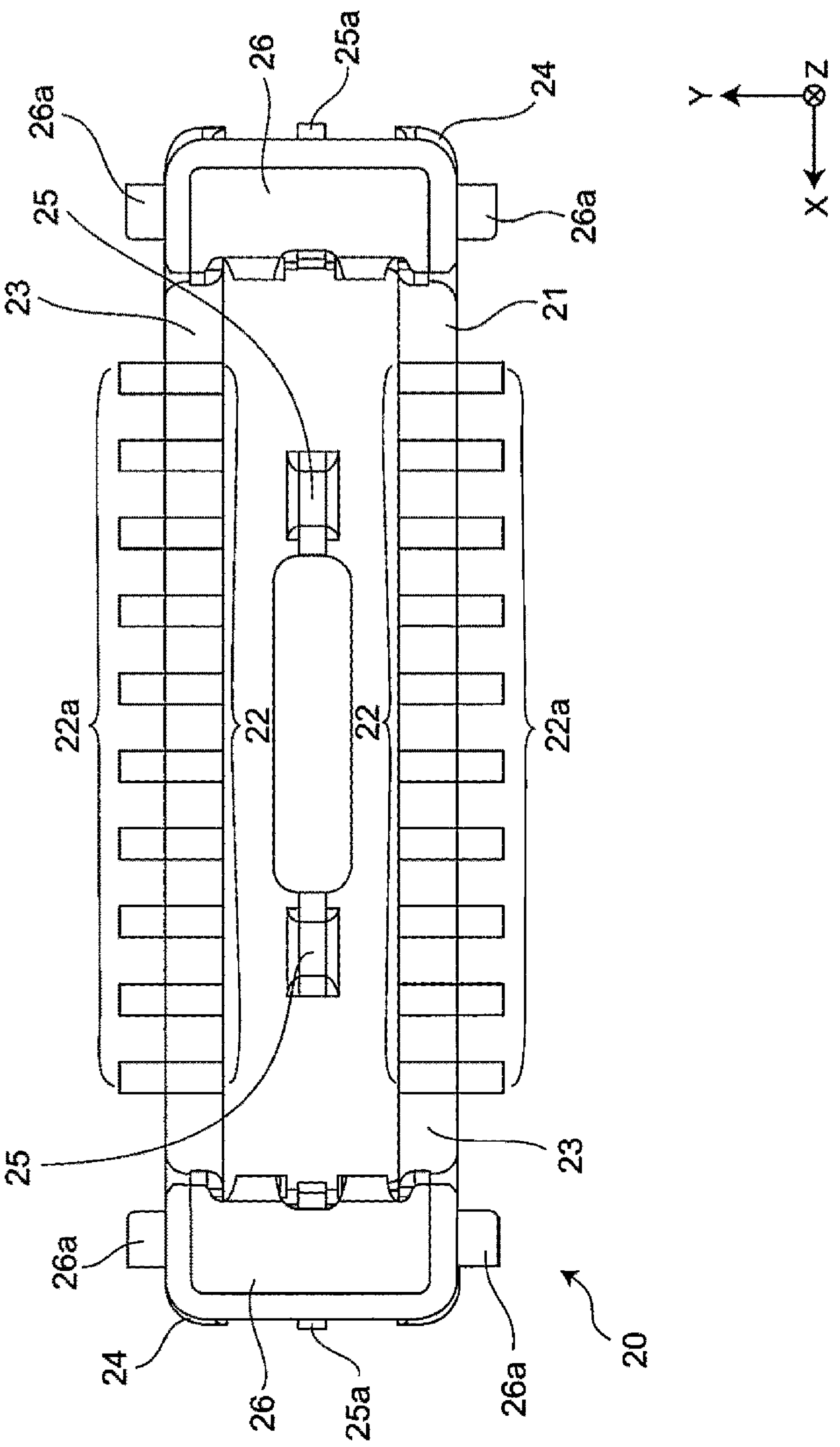
FIG. 3 is a plan view of the second connector illustrated in FIG. 2.

The basic configuration of the second connector 20 will be described while referring to FIGS. 2 and 3. FIG. 2 is a perspective view of the second connector 20 of the electrical connector set 1 illustrated in FIG. 1. FIG. 3 is a plan view of the second connector 20 illustrated in FIG. 2.

The second connector 20 includes a second insulating member 21, the second inner terminals 22, a second shield terminal 25, and two second outer terminals 26 and 26 (hereafter, may be simply referred to as second outer terminals 26). For example, an electrically insulating resin such as a liquid crystal polymer is used for the second insulating member 21. The second insulating member 21 includes a second terminal holding part 23 and two second lateral support parts 24. The second terminal holding part 23 is provided substantially in a center part of the second connector 20 in the first direction and the two second lateral support parts 24 are respectively provided at the two ends of the second connector 20 in the first direction so as to be separated from each other.

The second terminal holding part 23 has concave second inner terminal mounting parts. The second inner terminals 22 are held by mounting the second inner terminals 22 in the second inner terminal mounting parts. The second inner terminals 22 extend in the second direction. The meaning of the phrase "the second inner terminals 22 extend in the second direction" is intended to include directions that slightly deviate from the second direction in addition to a direction matches the second direction. The second inner terminals 22 are provided substantially in a center part of the second connector 20 in the first direction and consist of a plurality of connection terminals (for example, having a convex shape) arrayed in the first direction. Therefore, the second inner terminals 22 are usually also referred to as male multi-pole connection terminals. The second inner terminals 22 have a one-to-one correspondence with the first inner terminals 12. The second inner terminals 22 form electrical connections by engaging with the corresponding first inner terminals 12.

The electrically conductive second shield terminal 25 is provided between the rows of second inner terminals 22 located on one side and the other side in the second direction in order to suppress electromagnetic wave interference between the rows of second inner terminals 22. The second shield terminal 25 is, for example, held by being fitted into a center groove of the second terminal holding part 23. The second shield terminal 25 extends along the first direction.

The second inner terminals 22 are, for example, conductors that are connected to a signal potential or a ground potential and are formed by bending electrically conductive rod-shaped members. For example, phosphor bronze can be used for the second inner terminals 22. Phosphor bronze is a material that is electrically conductive and elastically deformable. The surfaces of the second inner terminals 22 may be plated with gold, for example. The second inner terminals 22 have second inner mounting parts 22*a* that are for mounting on land electrodes of a circuit board, which is not illustrated. In other words, the second inner mounting parts 22*a* are parts of the second inner terminals 22 that are to be connected to an electrically conductive bonding material such as solder and mounted on a circuit board. The second inner mounting parts 22*a* are formed along lateral edges located in the second direction.

The two second lateral support parts 24 include second outer terminal mounting parts. Corresponding second outer terminals 26 are mounted on and supported by the second outer terminal mounting parts. The second outer terminals 26 have second outer mounting parts 26*a* for mounting on ground electrodes of a circuit board, which is not illustrated. The second outer mounting parts 26*a* are formed at a lower edge in the third direction.

The second outer terminals 26 are conductors that are connected to a ground potential. The space surrounded by the second outer terminals 26 can be made into a space shielded from electromagnetic waves by connecting the second outer terminals 26 to the ground potential in order to shield the space against electromagnetic waves from the outside and unwanted radiation from the second shield terminal 25. In other words, the second outer terminals 26 are members for electromagnetically shielding the second shield terminal 25. For example, phosphor bronze can be used for the second outer terminals 26. Phosphor bronze is a material that is electrically conductive and elastically deformable. The second outer terminals 26 is, for example, formed by performing bending processing.

(First Insulating Member (Insulating Member))

Figure 6:
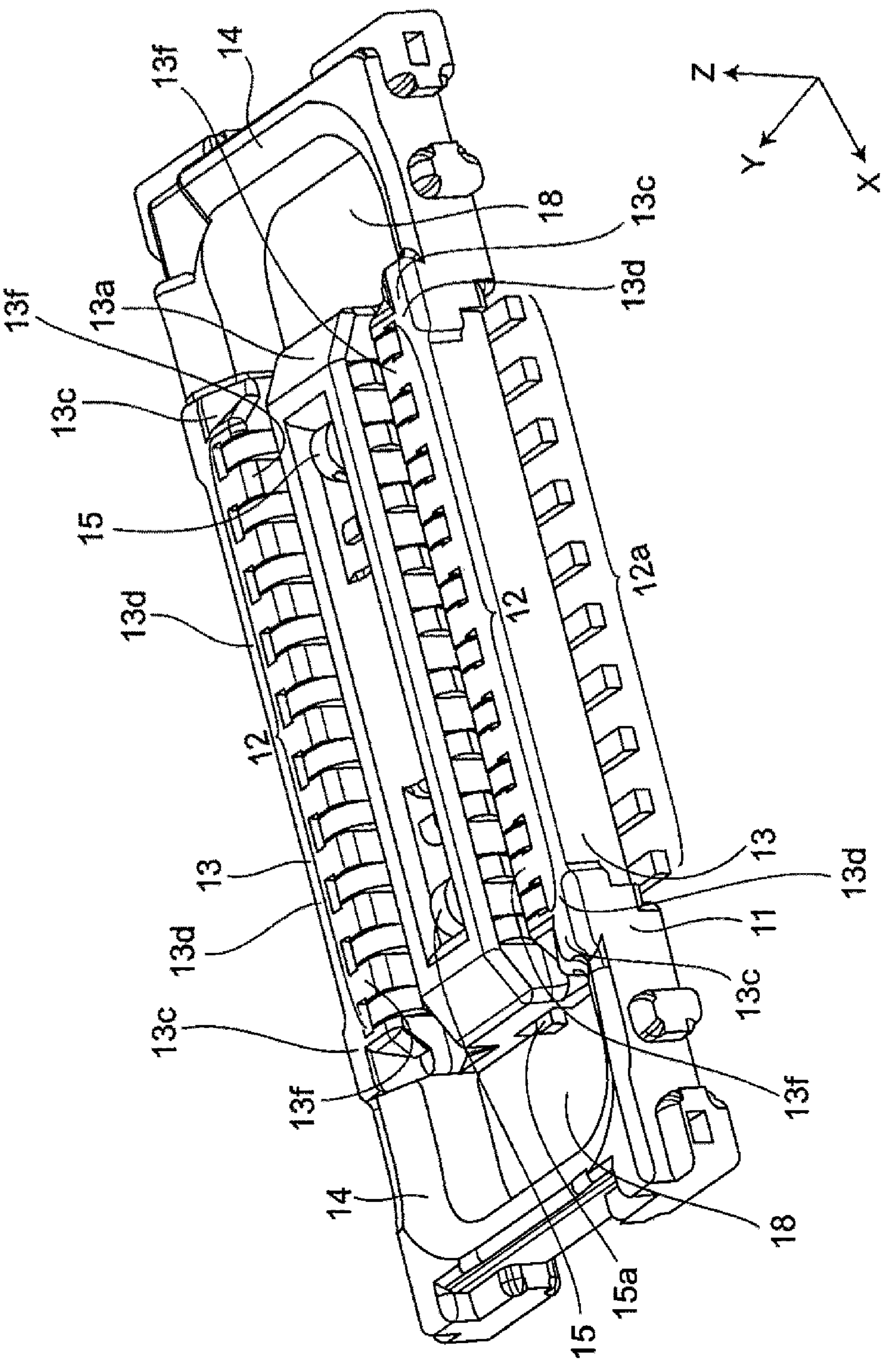
FIG. 6 is a perspective view of a first insulating member of the first connector illustrated in FIG. 4.
Figure 7:
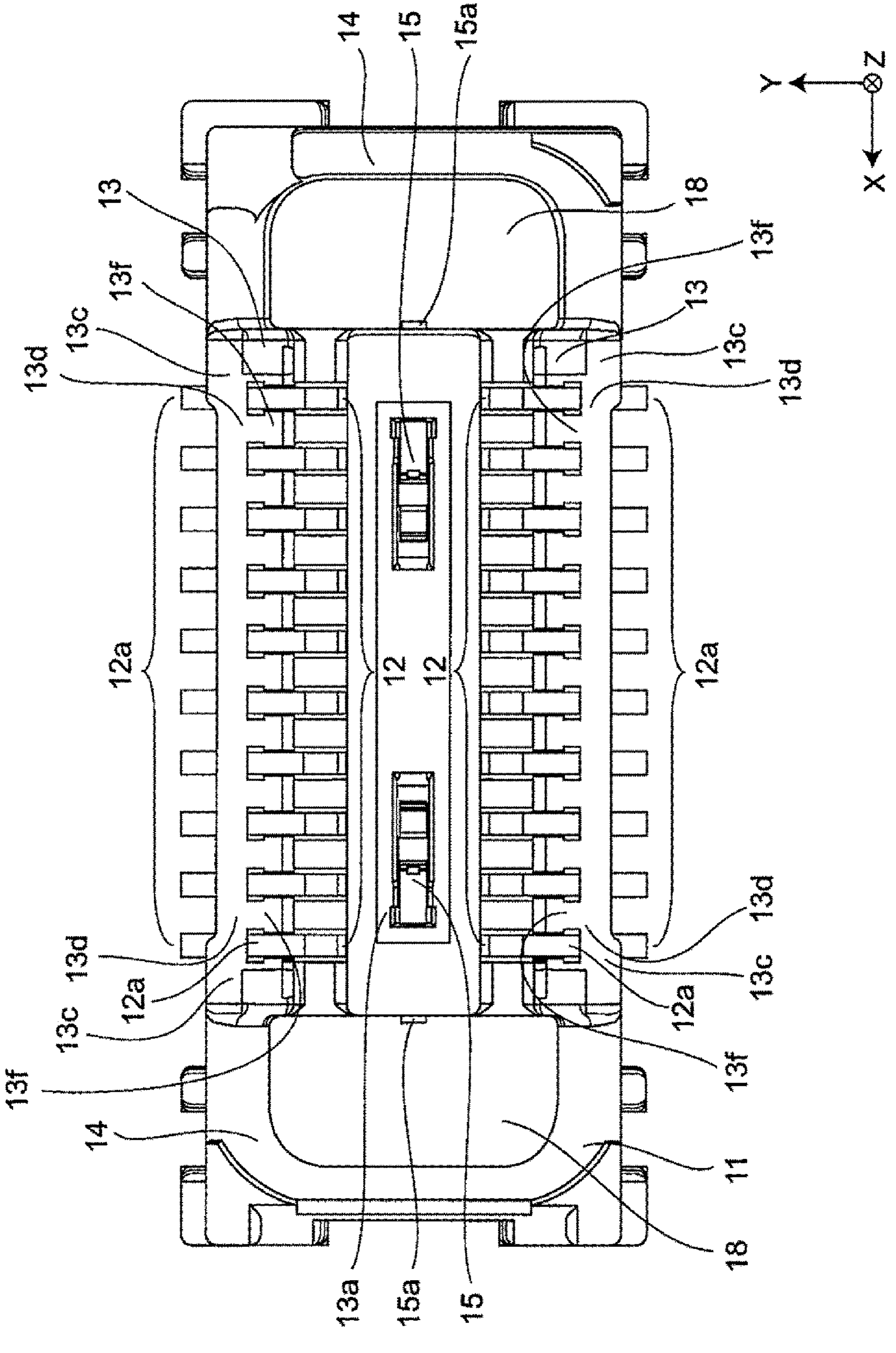
FIG. 7 is a plan view of the first insulating member illustrated in FIG. 6.
Figure 8:
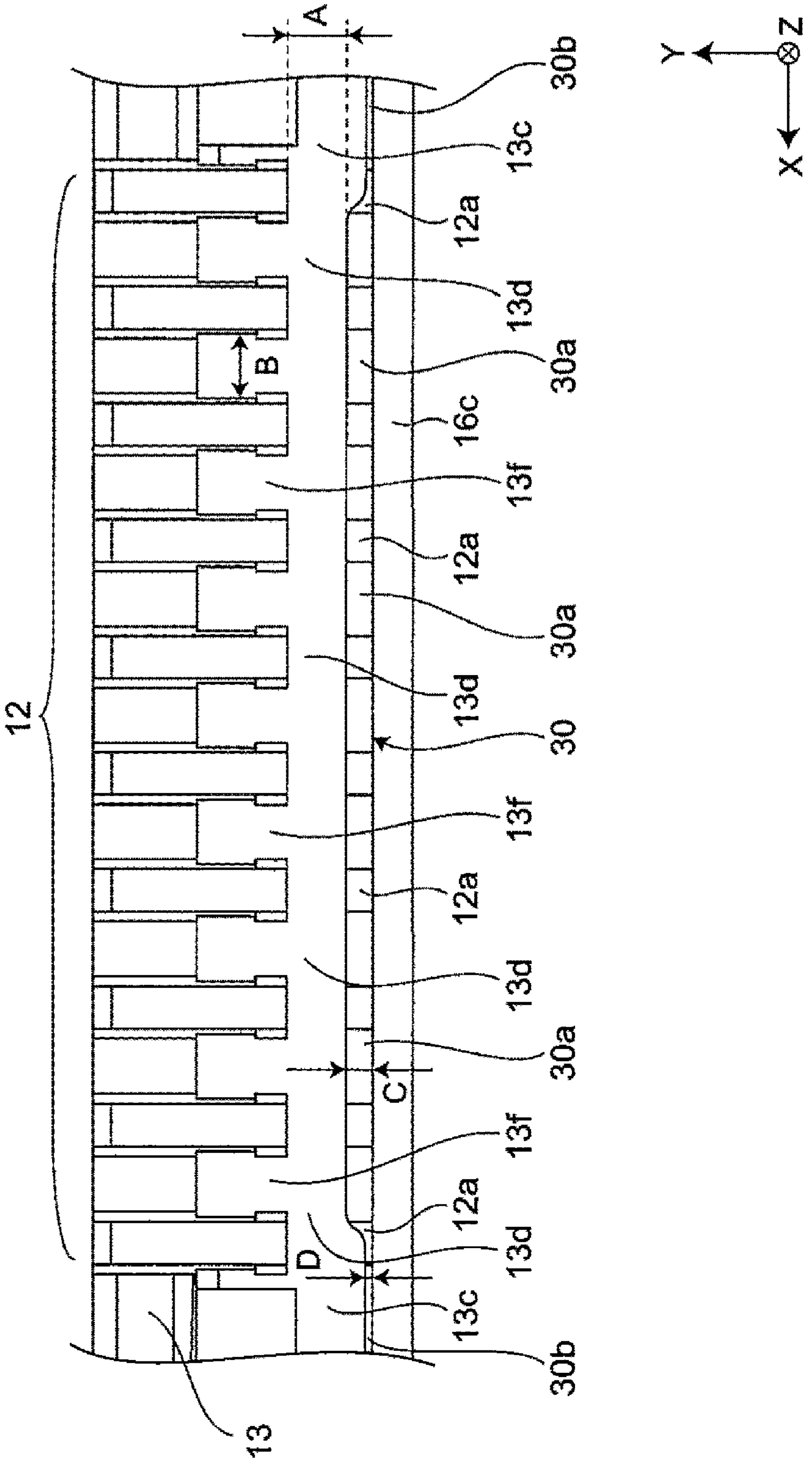
FIG. 8 is an enlarged view of main parts of the first connector illustrated in FIG. 5.

The first insulating member 11 will be described while referring to FIGS. 6, 7, and 8. FIG. 6 is a perspective view of the first insulating member 11 of the first connector 10 illustrated in FIG. 4. FIG. 7 is a plan view of the first insulating member 11 illustrated in FIG. 6. FIG. 8 is an enlarged view of main parts of the first connector 10 illustrated in FIG. 5.

The first insulating member 11 includes the first terminal holding part 13 and the first lateral support parts 14. The first terminal holding part 13 is located in a center part of the first connector 10 and has a substantially rectangular shape when viewed in the third direction. The first lateral support parts 14 are formed in lateral parts of the first connector 10 located in the first direction so as to be continuous with the first terminal holding part 13 and are substantially U-shaped when viewed in the third direction.

The first terminal holding part 13 includes first lateral end portions (insulating lateral end portions) 13*c* and first extending parts (insulating extending parts) 13*d*. The first lateral end portions (insulating lateral end portions) 13*c* are continuous with the first lateral support parts 14 and are located outside the first inner terminals 12 located at the lateral ends in the first direction. The first extending parts (insulating extending parts) 13*d* extend in the first direction from the first lateral end portions (insulating lateral end portions) 13*c*.

The first extending parts 13*d* extend in the first direction so that the first inner mounting parts 12*a* of the first inner terminals 12 are at least partially exposed when viewed in the third direction. The first inner mounting parts 12*a* are exposed means that parts of the first inner mounting parts 12*a* that will be soldered can be seen through a gap. As illustrated in FIG. 8, the dimensions are set so that the width of the first extending parts 13*d* in the second direction (second direction width A) is smaller than the width of the first lateral end portions 13*c* in the second direction (effectively the second direction width A plus an opening width C). In other words, the first extending parts 13*d* are provided so as to be recessed towards the center in the second direction compared to the end portions of the first lateral end portions 13*c* in the second direction.

Therefore, the first inner mounting parts 12*a* that are located at the lateral ends in the first direction are partially exposed when viewed in the third direction, whereas the first inner mounting parts 12*a* that are not located at the lateral ends are exposed over a larger region than the region over which the first inner mounting parts 12*a* located at the lateral ends are exposed when viewed in the third direction. In addition to forming openings 30, as described later, this configuration improves the flow of resin in narrow areas when creating the first insulating member 11 by injection molding.

End portions of the first terminal holding part 13 in the second direction have a cut away shape where the first terminal holding part 13 is cut away in the second direction as a result of the first extending parts 13*d* being shaped so as to be recessed toward the center in the second direction. Therefore, the openings 30 are formed by the shapes where the end portions of the first terminal holding part 13 in the second direction are cut away and first outer extending parts 16*c* that extend in the first direction. In other words, the openings 30 are formed at the sides near the first terminal holding part 13.

(First Outer Terminal (Outer Terminal))

Figure 9:
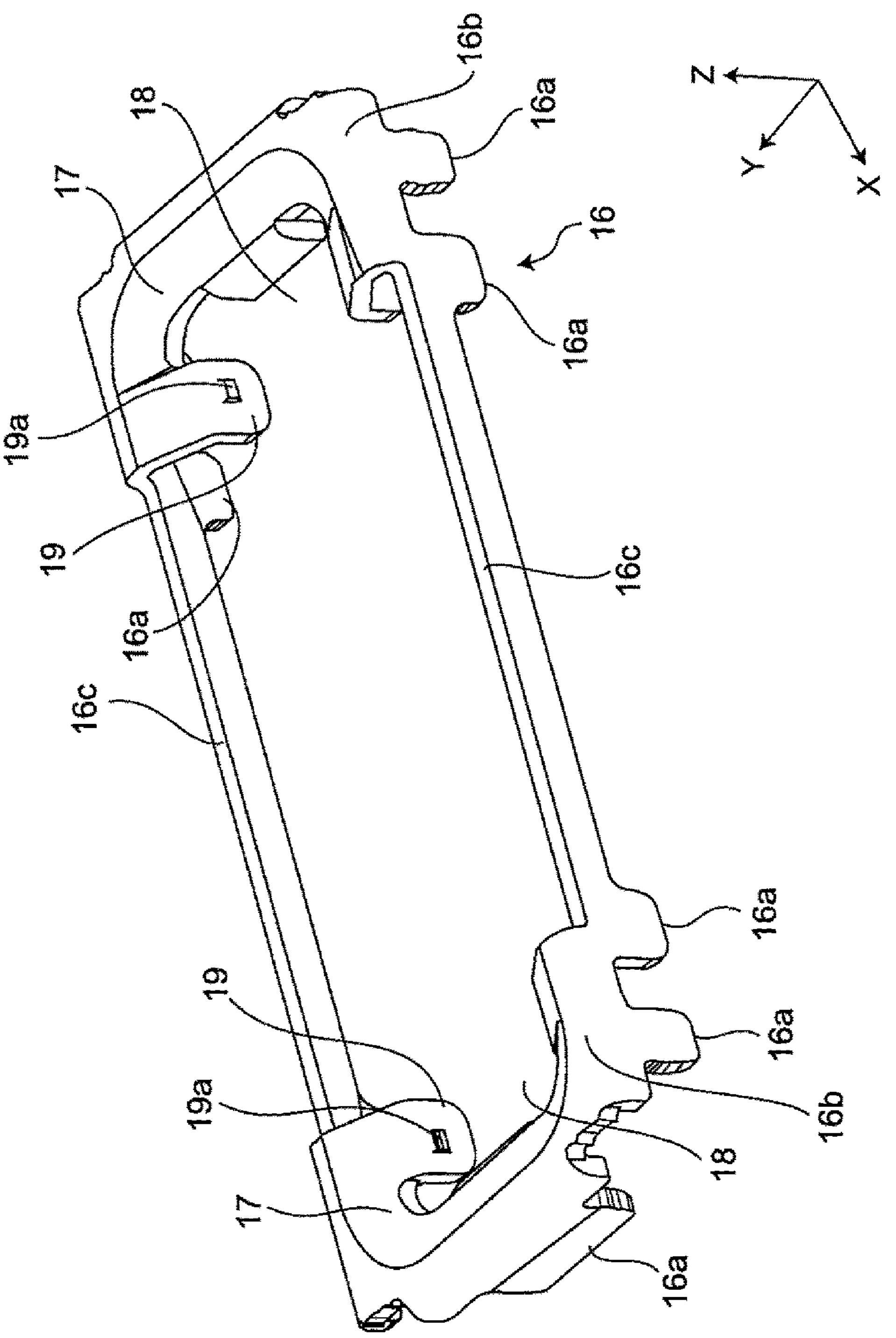
FIG. 9 is a perspective view of a first outer terminal of the first connector illustrated in FIG. 4.
Figure 10:
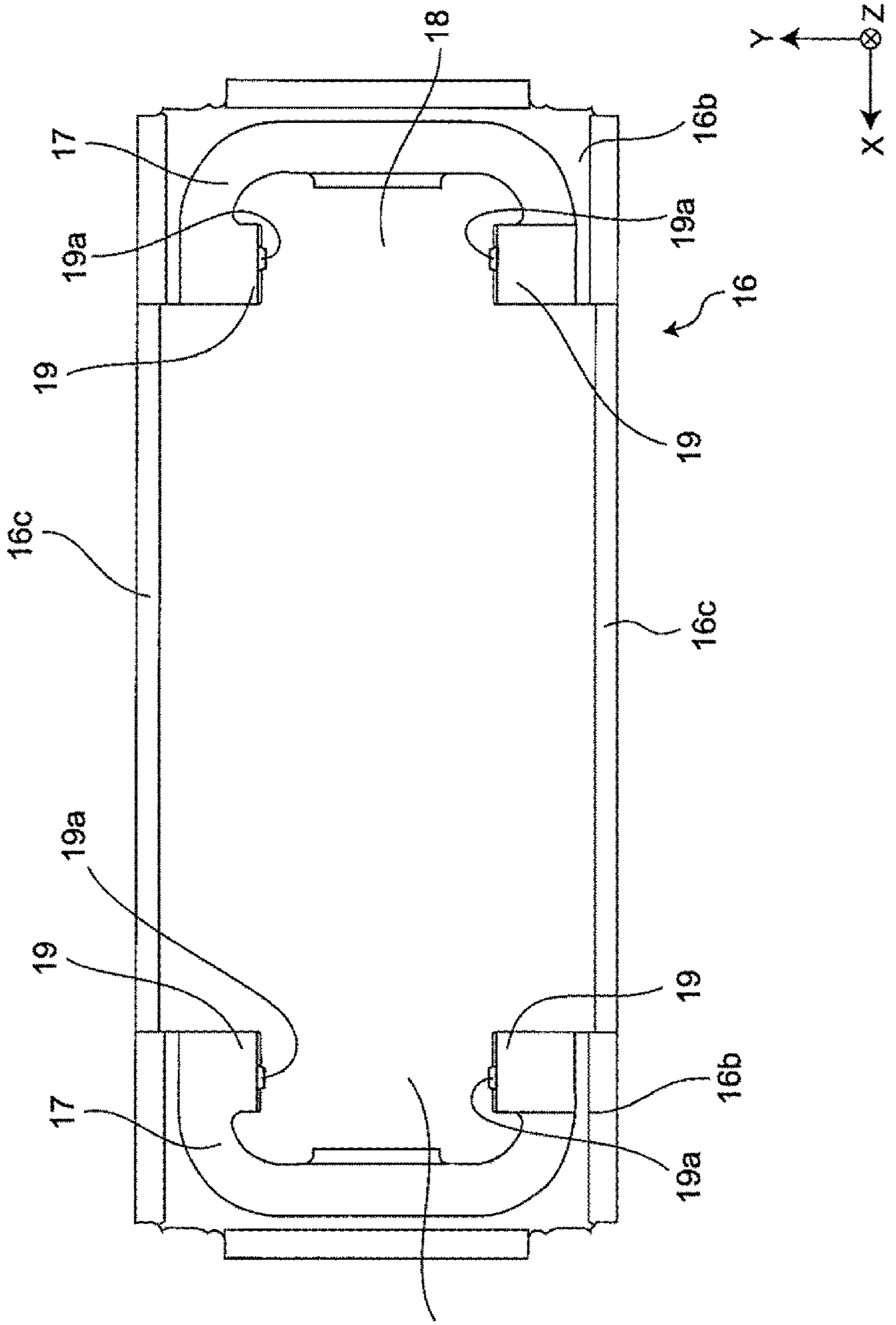
FIG. 10 is a plan view of the first outer terminal illustrated in FIG. 9.

The first outer terminal (outer terminal) 16 will be described while referring to FIGS. 9 and 10. FIG. 9 is a perspective view of the first outer terminal 16 of the first connector 10 illustrated in FIG. 4. FIG. 10 is a plan view of the first outer terminal 16 illustrated in FIG. 9.

As illustrated in FIGS. 9 and 10, the first outer terminal 16 is shaped like a frame having a substantially rectangular outline when viewed in the third direction. The first outer terminal 16 forms a closed loop shape such that the first inner terminals 12 in the row on one side and in the row on the other side are surrounded in a continuous manner when viewed in the third direction. Here, "loop shape" is not necessarily limited to a polygonal loop shape, and may be, for example, a circular loop shape, an elliptical loop shape, or a combination of polygonal and circular loop shapes.

The first outer terminal 16 includes the first outer lateral parts (outer lateral parts) 16*b*, the first outer extending parts (outer extending parts) 16*c*, guide parts 17, a mounting opening part 18, and first mating wall parts 19. The first outer lateral parts 16*b* are respectively provided at lateral parts on one side and the other side in the first direction. The first outer lateral parts 16*b* include the guide parts 17, the mounting opening part 18, and the first mating wall parts 19. The first mating wall parts 19 are respectively provided at the inner side on one side and the inner side on the other side in the second direction. first mating protrusions 19*a*, which serve as mating parts, are formed on the inner surfaces of the first mating wall parts 19. The first mating protrusions 19*a* of the first outer terminal 16 are configured so as to engage with second mating recesses 29*a* of the second outer terminals 26 when the first connector 10 and the second connector 20 are in a mated state. With this configuration, mating can be reliably realized without the first inner terminals 12, the first shield terminal 15, and so forth being affected.

The first outer lateral parts 16*b* are substantially U-shaped when viewed in the third direction. The guide parts 17 are substantially U-shaped when viewed in the third direction and incline downwards from the outside toward the inside. The guide parts 17 are used as guides for accurately guiding the second outer terminals 26 into the mounting opening part 18 when inserting the second connector 20 into the first connector 10 in the third direction. The mounting opening part 18 is an opening formed inside the guide parts 17 and has a substantially rectangular shape when viewed in the third direction. The first mating wall parts 19 extend in the third direction.

The first outer extending parts 16*c* extend in the first direction so as to connect the first outer lateral part 16*b* located on one side and the first outer lateral part 16*b* located on the other side to each other. The first outer extending parts 16*c* extend in straight lines in the first direction, for example. With this configuration, complex processing is not necessary for the first outer extending parts 16*c*. The two first outer extending parts 16*c* are provided so as to be separated from each other in the second direction. A plurality of the first outer mounting parts 16*a*, which are for mounting on a ground electrode of a circuit board, which is not illustrated, are formed on lower parts of the first outer extending parts 16*c*.

(Openings)

The openings 30 will be described while referring to FIG. 8. FIG. 8 is an enlarged view of main parts of the first connector 10 illustrated in FIG. 5.

As illustrated in FIG. 8, the first outer extending parts 16*c* of the first outer terminal 16 extend in the first direction while being spaced apart from the first extending parts (insulating extending parts) 13*d*. In other words, the first outer extending parts 16*c* extend in the first direction next to the first extending parts (insulating extending parts) 13*d* while being at a prescribed distance from the first extending parts (insulating extending parts) 13*d*. The openings 30, which extend in the first direction and have a width of a certain size in the second direction, are formed between the first extending parts 13*d* and the first outer extending parts 16*c*. The openings 30 include opening parts 30*a*. The first outer extending parts 16*c* and the opening parts 30*a*, for example, extend in straight lines in the first direction. In other words, single openings 30 are formed through which the first inner mounting parts 12*a* of the plurality of first inner terminals 12 can be seen in one go and the openings 30 are formed by separating parts of the first insulating member 11 from the first outer terminal 16. With this configuration, since the openings 30 are formed uniformly along the first direction with a prescribed width, the states of the first inner mounting parts 12*a* can be checked at any position even when design changes are made with respect to the pitch and number of the first inner terminals 12. In other words, the connection states between the first inner mounting parts 12*a* of the first inner terminals 12 and a circuit board can be seen through the openings 30. In addition, the openings 30 can be formed without changing the shape of the first outer terminal 16, and therefore complex processing of the first outer terminal 16 can be avoided.

The openings 30 each include gap parts 30*b* at one end and the other end of the opening parts 30*a* in the first direction. The gap parts 30*b* extend in straight lines in the first direction, for example. The opening width C of the openings 30 and a gap width D of the gap parts 30*b* are set so that the states of the first inner mounting parts 12*a* of the first inner terminals 12 can be checked. The opening width C of the opening parts 30*a* in the second direction is larger than the gap width D of the gap parts 30*b* in the second direction.

The prescribed spacing at the first inner mounting parts 12*a* that are not located at one end and the other end in the first direction is the opening width C of the opening parts 30*a*. The first inner mounting parts 12*a* that are not located at the ends are exposed over a larger region than the region over which the first inner mounting parts 12*a* located at the ends are exposed when viewed in the third direction. On the other hand, the prescribed spacing at the first inner mounting parts 12*a* that are located at one end and the other end in the first direction is the opening width C of the opening parts 30*a* at the inner side and the gap width D of the gap parts 30*b* at the outer side. The first inner mounting parts 12*a* located at the ends in the first direction are partially exposed when viewed in the third direction. As described above, with this structure, an effect is realized that it becomes easier to perform resin molding while retaining the openings 30. With this configuration, the states of the first inner mounting parts 12*a* of the first inner terminals 12 can be checked through the openings 30. In other words, the connection states between the first inner mounting parts 12*a* of the first inner terminals 12 and a circuit board can be seen through the openings 30. Checking the states of the first inner mounting parts 12*a* through the openings 30 includes, for example, checking the state of the electrically conductive bonding material (for example, solder) when mounted, the presence or absence of misalignments with respect to the land electrodes of the circuit board, and the presence or absence of intervening foreign matter.

With this configuration, since the openings 30 are formed by the insulating extending parts 13*d*, which have a small width in the second direction, and the outer extending parts 16*c*, which extend in the first direction while being spaced apart from the insulating extending parts 13*d*, it is possible to form the openings 30, through which the states of the inner mounting parts 12*a* of the first inner terminals 12 can be checked, without the need for complex processing.

(Size of Insulating Member)

The size of the first insulating member 11 will be described as an exemplary example while referring to FIG. 8, but this is merely an example and does not limit the present disclosure.

As described above, the first insulating member 11 is, for example, composed of an electrically insulating resin such as a liquid crystal polymer and is formed by injection molding. When injection molding gates are provided in the first lateral support parts 14, the resin flows from the first lateral support parts 14 to the first terminal holding part 13. At this time, the resin flows from the first lateral support parts 14 to the first terminal holding part 13 through the first lateral end portions 13*c*, which connect the first lateral support parts 14 and the first terminal holding part 13 to each other. The resin flowing through the first lateral end portions 13*c* flows through the first extending parts 13*d* and some of the resin flows into inter-first-terminal support parts 13*f*. In other words, the resin flowing through the first lateral end portions 13*c* splits and flows into the first extending parts 13*d* and the inter-first-terminal support parts 13*f*.

As illustrated in FIG. 8, the width of the first extending parts 13*d* in the second direction is defined as the second direction width A and the width of the inter-first-terminal support parts 13*f* in the first direction is defined as a first direction width B. In the case where the second direction width A is larger than the first direction width B, there is a chance that the resin may not properly flow into the inter-first-terminal support parts 13*f*. Therefore, a relationship in which the first direction width B is greater than or equal to the second direction width A (first direction width B second direction width A) is preferred. As a result, electrical insulation between the first inner terminals 12 can be maintained. In addition, when the inter-first-terminal support parts 13*f* (first direction width B becomes smaller) are made narrower by making the pitch between the first inner terminals 12 smaller, i.e., reducing the pitch, it is even more important that the above relationship be satisfied.

In addition, when the second direction width A is made smaller, the opening width C becomes relatively larger, and therefore it becomes easier to check the states of first inner mounting parts 12*a*. For example, the ratio of the second direction width A to the opening width C can be around 2:1. In addition, in the case where the first connector 10 includes the first shield holding part 13*a* at the center of the first terminal holding part 13 in the second direction, the resin filled into the inter-first-terminal support parts 13*f* flows into the first shield holding part 13*a* as well, and consequently filling of resin into the first shield holding part 13*a* via the inter-first-terminal support parts 13*f* is realized with certainty.

In addition, if resin inlets (gates) can only be provided on the outer side, in the first direction, of the plurality of arrayed first inner terminals 12, it is preferable that the first direction width B and the second direction width A be equal to each other (first direction width B=second direction width A) so that the resin can spread through each of the inter-first-terminal support parts 13*f* and the inter-first-terminal support parts 13*f* can be properly filled with resin. This enables the resin to split evenly and flow into the first extending parts 13*d* and the inter-first-terminal support parts 13*f* and stable filling of resin can be performed.

SECOND EMBODIMENT

Figure 11:
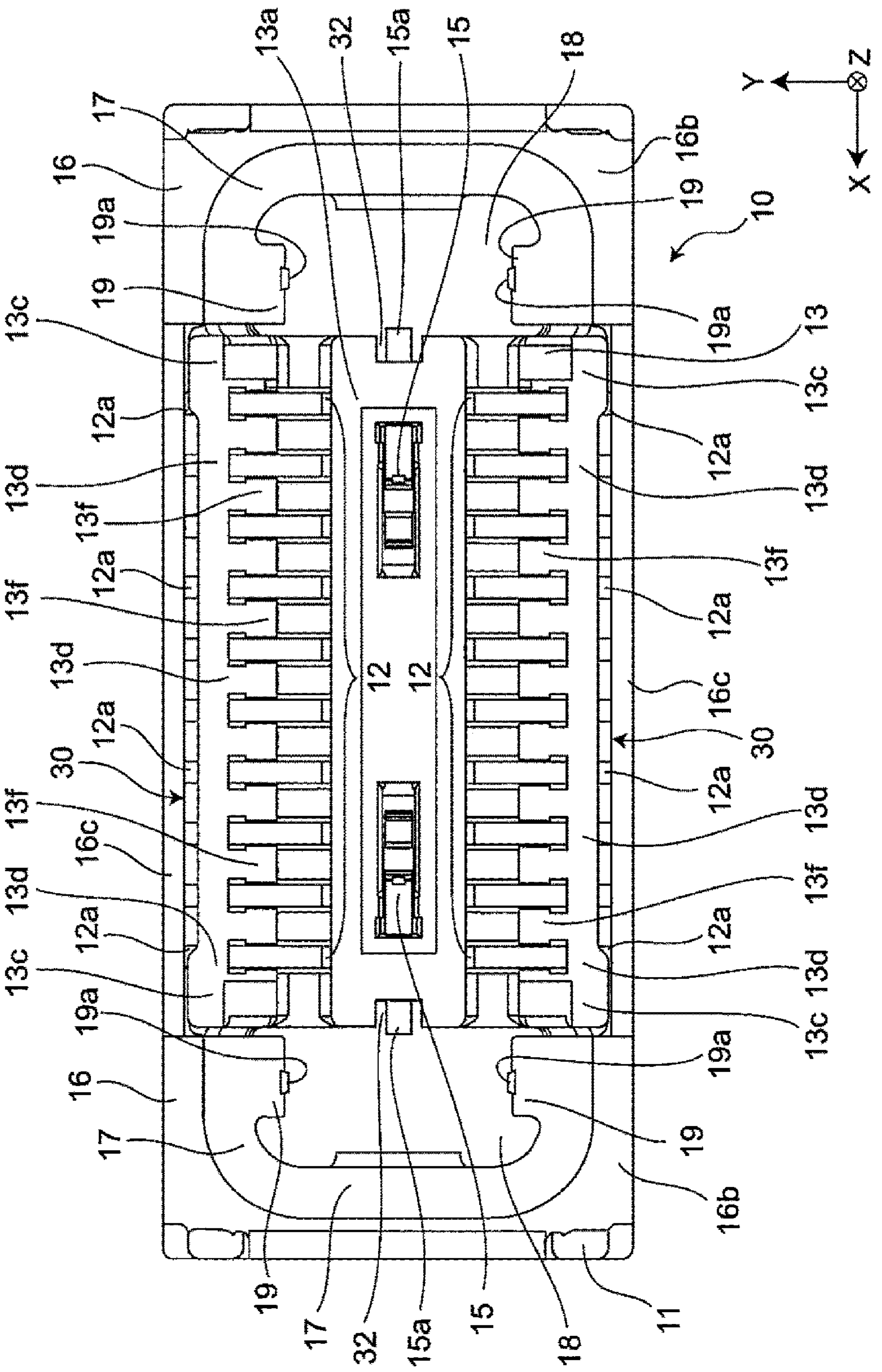
FIG. 11 is a plan view of a first connector according to a Second Embodiment.

A Second Embodiment will be described while referring to FIG. 11. FIG. 11 is a plan view of a first connector 10 according to the Second Embodiment.

A feature of the first connector 10 according to the Second Embodiment is that the first shield holding part 13*a* includes cut away openings 32.

As described above, the first shield terminal 15, which extends in the first direction, is held by the first shield holding part 13*a*. The first shield terminal 15 has first shield mounting parts (shield mounting parts) 15*a* for mounting on a ground electrode of a circuit board, which is not illustrated. The first shield mounting parts 15*a* are respectively formed at one end and the other end in the first direction.

The cut away openings 32 are openings that are cut away so that the first shield mounting parts 15*a* of the first shield terminal 15 are at least partially exposed when viewed in the third direction. The cut away openings 32 are formed by cutting away ends located on one side and the other side in the first direction so as to correspond to the first shield mounting parts 15*a*. The cut away openings 32, for example, have a rectangular shape.

With this configuration, the states of the first shield mounting parts 15*a* of the first shield terminal 15 can be checked through the cut away openings 32. Checking the states of the first shield mounting parts 15*a* through the cut away openings 32 includes, for example, checking the state of the electrically conductive bonding material (for example, solder) when mounted, the presence or absence of misalignments with respect to a ground electrode of the circuit board, and the presence or absence of intervening foreign matter.

Specific embodiments of the present disclosure have been described, but the present disclosure is not limited to the above-described embodiments and can be changed in various ways within the scope of the present disclosure.

The opening parts 30*a* of the openings 30 can extend up to the first lateral end portions 13*c* in the first direction. In other words, the openings 30 can be configured so as to omit the gap parts 30*b* and make the opening parts 30*a* extend up to the vicinities of the first lateral support parts 14 in the first direction. This allows all of the first inner mounting parts 12*a* of the first inner terminals 12 to be exposed when viewed in the third direction. With this configuration, the states of all of the first inner mounting parts 12*a* can be easily checked through the openings 30.

The present disclosure and embodiments can be summarized as follows.

An electrical connector 10 according to an aspect of the present disclosure includes a plurality of inner terminals 12 that are arrayed in a first direction and extend in a second direction perpendicular to the first direction, an insulating member 11 having a terminal holding part 13 that holds the inner terminals 12, and an outer terminal 16 that surrounds the inner terminals 12 when viewed in a third direction perpendicular to the first direction and the second direction. The terminal holding part 13 includes an insulating extending part 13*d* that extends in the first direction. The outer terminal 16 includes an outer extending part 16*c* that extends in the first direction while being spaced apart from the insulating extending part 13*d* along at least part thereof. An opening 30, which extends in the first direction, is formed between the insulating extending part 13*d* and the outer extending part 16*c*. The states of inner mounting parts 12*a* of the inner terminals 12 can be checked through the opening 30.

With this configuration, since the opening 30 is formed by the insulating extending part 13*d*, which extends in the first direction, and the outer extending part 16*c*, which extends in the first direction while being spaced apart from the insulating extending part 13*d*, it is possible to form the opening 30, through which the states of the inner mounting parts 12*a* of the inner terminals 12 can be checked, without the need for complex processing.

In addition, according to an embodiment, in the electrical connector 10, the inner mounting parts 12*a* of the inner terminals 12 are exposed inside the opening 30 when viewed in the third direction.

According to this embodiment, the states of the inner mounting parts 12*a* can be easily checked through the opening 30.

In addition, according to an embodiment, in the electrical connector 10, the outer extending part 16*c* extends in a straight line in the first direction when viewed in the third direction.

According to this embodiment, since the opening 30 is formed uniformly along the first direction with a prescribed width, the states of the inner mounting parts 12*a* can be checked at any position even when design changes are made with respect to the pitch and number of inner terminals 12.

In addition, according to an embodiment, in the electrical connector 10, the terminal holding part 13 includes an inter-terminal support part 13*f* located between two adjacent inner terminals 12. Also, a first direction width B of the inter-terminal support part 13*f* is greater than or equal to a second direction width A of the insulating extending part 13*d* in the second direction.

According to this embodiment, the narrow inter-terminal support part 13*f* can be stably filled with resin and the opening width of the opening 30 becomes relatively wider due to the second direction width A being reduced, and therefore the states of the inner mounting parts 12*a* can be more easily checked.

Furthermore, according to an embodiment, in the electrical connector 10, the first direction width B of the inter-terminal support part 13*f* is equal to the second direction width A of the insulating extending part 13*d*.

According to this embodiment, the resin splits evenly and flows into the insulating extending part 13*d* and the inter-terminal support part 13*f* and therefore filling of resin can be stably performed.

Furthermore, according to an embodiment, in the electrical connector 10, a row on another side in which the inner terminals 12 are arrayed in the first direction is disposed so as to be separated in the second direction from a row on one side in which the inner terminals 12 are arrayed in the first direction.

According to this embodiment, a large number of inner terminals 12 can be disposed in the area of the terminal holding part 13 having a limited size.

Furthermore, according to an embodiment, in the electrical connector 10, a shield terminal 15 for isolating the row on the one side and the row on the other side from each other is provided between the one row on one side and the row on the other side. The terminal holding part 13 has a shield holding part 13*a* that holds the shield terminal 15 in an electrically insulated state. A cut away opening 32 is formed by cutting away a lateral end of the shield holding part 13*a* in the first direction. A shield mounting part 15*a* of the shield terminal 15 can be checked through the cut away opening 32.

According to this embodiment, the state of the shield mounting part 15*a* of the shield terminal 15 can be checked through the cut away opening 32.

In addition, according to an embodiment, in the electrical connector 10, the shield mounting part 15*a* of the shield terminal 15 is exposed inside the cut away opening 32 when viewed in the third direction.

According to this embodiment, the state of the shield mounting part 15*a* can be easily checked through the cut away opening 32.

Furthermore, according to an embodiment, in the electrical connector 10, the outer terminal 16 includes an outer lateral part 16*b* at a lateral end of the outer extending part 16*c* in the first direction and a mating part 19*a*, which is for insertable-removable mating, is formed on the outer lateral part 16*b*.

According to this embodiment, mating can be realized with certainty without affecting the inner terminals 12, the shield terminal 15, and so on.

An electrical connector set 1 according to an aspect of the present disclosure includes the above-described electrical connector 10, and a counterpart electrical connector 20 that mates with the electrical connector 10 in an insertable-removable manner in an insertion-removal direction.

With this configuration, the electrical connector set 1 can be provided in which the opening 30, through which it is possible to check the state of the inner mounting parts 12*a* of the inner terminals 12, can be formed without the need for complex processing.

What is claimed is:

1. An electrical connector comprising:
a plurality of inner terminals that are arrayed in a first direction and extend in a second direction perpendicular to the first direction;
an insulating member that has a terminal holding part that holds the inner terminals, the terminal holding part including an insulating extending part that extends in the first direction; and
an outer terminal that surrounds the inner terminals when viewed in a third direction that is perpendicular to the first direction and the second direction, the outer terminal including an outer extending part that extends in the first direction while being spaced apart from the insulating extending part along at least part thereof,
wherein
an opening that extends in the first direction is between the insulating extending part and the outer extending part,
the opening extends in a continuous manner in the first direction from the inner terminal located on one side in the first direction to the inner terminal located on an other side in the first direction, and
states of inner mounting parts of the inner terminals are viewable through the opening.

2. The electrical connector according to claim 1,
wherein a gap width of gap parts of the opening located at one side and the other side in the first direction is smaller than an opening width of the opening at places other than at the one side and the other side in the first direction.

3. The electrical connector according to claim 2, wherein the inner mounting parts of the inner terminals are exposed inside the opening when viewed in the third direction.

4. The electrical connector according to claim 1, wherein the outer extending part extends in a straight line in the first direction when viewed in the third direction.

5. The electrical connector according to claim 1, wherein the terminal holding part includes an inter-terminal support part located between two adjacent inner terminals, and
a first direction width of the inter-terminal support part is greater than or equal to a second direction width of the insulating extending part in the second direction.

6. The electrical connector according to claim 5, wherein the first direction width of the inter-terminal support part is equal to the second direction width of the insulating extending part.

7. The electrical connector according to claim 1, wherein a row on an other side in which the inner terminals are arrayed in the first direction is disposed so as to be separated in the second direction from a row on one side in which the inner terminals are arrayed in the first direction.

8. The electrical connector according to claim 7, wherein a shield terminal for isolating the row on the one side and the row on the other side from each other is provided between the one row on the one side and the row on the other side, the terminal holding part has a shield holding part that holds the shield terminal in an electrically insulated state, a cut away opening is configured by cutting away a lateral end of the shield holding part in the first direction, and a shield mounting part of the shield terminal is viewable through the cut away opening.

9. The electrical connector according to claim 8, wherein the shield mounting part of the shield terminal is exposed inside the cut away opening when viewed in the third direction.

10. The electrical connector according to claim 1, wherein the outer terminal includes an outer lateral part at a lateral end of the outer extending part in the first direction, and a mating part, which is for insertable-removable mating, is on the outer lateral part.

11. An electrical connector set comprising:

the electrical connector according to claim 1, and a counterpart electrical connector that is configured to mate with the electrical connector in an insertable-removable manner in an insertion-removal direction.

12. The electrical connector according to claim 2, wherein the outer extending part extends in a straight line in the first direction when viewed in the third direction.

13. The electrical connector according to claim 3, wherein the outer extending part extends in a straight line in the first direction when viewed in the third direction.

14. The electrical connector according to claim 2, wherein the terminal holding part includes an inter-terminal support part located between two adjacent inner terminals, and a first direction width of the inter-terminal support part is greater than or equal to a second direction width of the insulating extending part in the second direction.

15. The electrical connector according to claim 3, wherein the terminal holding part includes an inter-terminal support part located between two adjacent inner terminals, and a first direction width of the inter-terminal support part is greater than or equal to a second direction width of the insulating extending part in the second direction.

16. The electrical connector according to claim 4, wherein the terminal holding part includes an inter-terminal support part located between two adjacent inner terminals, and a first direction width of the inter-terminal support part is greater than or equal to a second direction width of the insulating extending part in the second direction.

17. The electrical connector according to claim 2, wherein a row on an other side in which the inner terminals are arrayed in the first direction is disposed so as to be separated in the second direction from a row on one side in which the inner terminals are arrayed in the first direction.

18. The electrical connector according to claim 3, wherein a row on an other side in which the inner terminals are arrayed in the first direction is disposed so as to be separated in the second direction from a row on one side in which the inner terminals are arrayed in the first direction.

19. The electrical connector according to claim 2, wherein the outer terminal includes an outer lateral part at a lateral end of the outer extending part in the first direction, and a mating part, which is for insertable-removable mating, is on the outer lateral part.

20. An electrical connector set comprising:

the electrical connector according to claim 2, and a counterpart electrical connector that is configured to mate with the electrical connector in an insertable-removable manner in an insertion-removal direction.

21. The electrical connector according to claim 1, wherein the opening extends in the first direction between the outer extending part and a part of an outer periphery of the insulating member at the insulating extending part.

22. An electrical connector comprising:

a plurality of inner terminals that are arrayed in a first direction and extend in a second direction perpendicular to the first direction;

an insulating member that has a terminal holding part that holds the inner terminals, the terminal holding part including an insulating extending part that extends in the first direction; and an outer terminal that is peripheral to the inner terminals when viewed in a third direction that is perpendicular to the first direction and the second direction, the outer terminal including an outer extending part that extends in the first direction while being spaced apart from the insulating extending part along at least part thereof, wherein an opening that extends in the first direction is between the insulating extending part and the outer extending part, the opening extends in a continuous manner in the first direction from the inner terminal located on one side in the first direction to the inner terminal located on an other side in the first direction, and states of inner mounting parts of the inner terminals are viewable through the opening.

23. An electrical connector comprising:

a plurality of inner terminals arrayed in a first direction, the inner terminals comprising inner mounting parts structured for mounting on land electrodes of a circuit board, the inner mounting parts extending in a second direction perpendicular to the first direction;

an insulating member including a terminal holding part extending in the first direction and holding the inner terminals;

an outer terminal including an outer extending part extending in the first direction; and an opening existing between the outer extending part and the terminal holding part when viewed in a third direction that is perpendicular to the first direction and the second direction, the inner mounting parts being viewable through the opening.

* * * * *